United States Patent
Kim

(10) Patent No.: US 12,316,213 B2
(45) Date of Patent: May 27, 2025

(54) SNUBBER CIRCUIT

(71) Applicant: LG INNOTEK CO., LTD., Seoul (KR)

(72) Inventor: Kyung Hyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 156 days.

(21) Appl. No.: 17/788,621

(22) PCT Filed: Nov. 25, 2020

(86) PCT No.: PCT/KR2020/016782
§ 371 (c)(1),
(2) Date: Jun. 23, 2022

(87) PCT Pub. No.: WO2021/137441
PCT Pub. Date: Jul. 8, 2021

(65) Prior Publication Data
US 2023/0029203 A1 Jan. 26, 2023

(30) Foreign Application Priority Data
Dec. 30, 2019 (KR) .......................... 10-2019-0177707

(51) Int. Cl.
*H02M 1/34* (2007.01)
*H02M 3/335* (2006.01)

(52) U.S. Cl.
CPC ....... *H02M 1/344* (2021.05); *H02M 3/33576* (2013.01)

(58) Field of Classification Search
CPC ............. H02M 1/32; H02M 1/34–348; H02M 3/33573; H02M 3/33576–33592
See application file for complete search history.

(56) References Cited

U.S. PATENT DOCUMENTS

| | | | |
|---|---|---|---|
| 6,853,563 B1 | 2/2005 | Yang et al. | |
| 6,980,447 B1 * | 12/2005 | Schaible | H02M 3/33592 |
| | | | 363/56.05 |
| 9,178,429 B2 | 11/2015 | Tian et al. | |
| 2003/0206421 A1 | 11/2003 | Suh et al. | |
| 2012/0127762 A1 | 5/2012 | Reddy | |

(Continued)

FOREIGN PATENT DOCUMENTS

| | | |
|---|---|---|
| CN | 1826720 A | 8/2006 |
| JP | 5-276650 A | 10/1993 |

(Continued)

OTHER PUBLICATIONS

Ito et al., "Novel Low Loss Active Voltage Clamp Circuit for Series Connection of GCT thyristors," Power Electronics Specialists Conference, vol. 2, 2002, pp. 636-641.

*Primary Examiner* — Fred E Finch, III

(74) *Attorney, Agent, or Firm* — Birch, Stewart, Kolasch & Birch, LLP

(57) ABSTRACT

A snubber circuit according to an embodiment of the present invention, which is connected to a secondary side switch of a transformer, comprises: a diode connected to an input terminal of the secondary side switch; a capacitor connected to an output terminal of the diode; a resistor connected in parallel with the capacitor; and a snubber switch for connecting the resistor and ground.

18 Claims, 8 Drawing Sheets

(56) References Cited

U.S. PATENT DOCUMENTS

| | | | |
|---|---|---|---|
| 2013/0223104 A1* | 8/2013 | Tian | H02M 3/33576 363/17 |
| 2014/0126247 A1* | 5/2014 | Koch | H02M 1/34 363/21.14 |
| 2016/0322915 A1 | 11/2016 | Bazzi et al. | |
| 2017/0025968 A1* | 1/2017 | Wong | H02M 3/33592 |

FOREIGN PATENT DOCUMENTS

| | | |
|---|---|---|
| JP | 2015-186363 A | 10/2015 |
| JP | 2019-187004 A | 10/2019 |
| KR | 2003-0066239 A | 8/2003 |
| KR | 10-2009911 B1 | 8/2019 |
| WO | WO 93/34313 A1 | 8/1998 |

* cited by examiner

Starting point of the snubber MOSFET

SNUBBER CIRCUIT

CROSS REFERENCE TO RELATED APPLICATIONS

This application is the National Phase of PCT International Application No. PCT/KR2020/016782, filed on Nov. 25, 2020, which claims priority under 35 U.S.C. 119 (a) to Patent Application No. 10-2019-0177707, filed in the Republic of Korea on Dec. 30, 2019, all of which are hereby expressly incorporated by reference into the present application.

TECHNICAL FIELD

The present invention relates to a snubber circuit, and more particularly, to a snubber circuit that operates only above a reference voltage.

BACKGROUND ART

Among electric circuits including various types of coils, there are electric circuits that include a switching element together with the coil and control the current and voltage flowing through the coil by controlling on/off of the switching element to achieve a desired purpose. In such electric circuits, when the switching element is on, the current flows smoothly through the coil and the switching element, and when the switching element changes state from on to off, an excessive voltage may be instantaneously generated in the corresponding electric circuit due to a counter electromotive voltage generated from the coil itself. Such an excessive voltage acts as a great burden on the switching element. In particular, a distorted overshoot voltage may occur in the switching element at the moment when the state changes from on to off due to a high-frequency component deviated from a predetermined voltage range, and such an overshoot voltage may act as a greater burden on the switching element.

The snubber circuit is a circuit additionally connected to the power switch to reduce voltage stress caused by external energy such as an inductor current during a switching operation of the power switch. A typical example in which a snubber circuit is used is a flyback converter. When the switch is turned off, the energy stored in the converter leakage inductance creates excessive voltage stress on the drain of the power switch. This may cause burnout of the power switch, so it is necessary to limit the maximum voltage applied to the drain terminal of the power switch.

DETAILED DESCRIPTION OF THE INVENTION

Technical Subject

A technical problem to be solved by the present invention is to provide a snubber circuit that operates only above a reference voltage.

The problems of the present invention are not limited to the problems mentioned above, and other problems not mentioned will be clearly understood by those skilled in the art from the following description.

Technical Solution

In order to solve the technical problem, a snubber circuit according to an embodiment of the present invention, which is connected to a secondary side switch of a transformer, comprises: a diode being connected to an input terminal of the secondary side switch; a capacitor being connected to an output terminal of the diode; a resistor being connected in parallel with the capacitor; and a snubber switch connecting the resistor and ground.

In addition, when the snubber switch is turned on, a path including the resistor may be connected so that the resistor may discharge energy stored in the capacitor.

In addition, it may include a controller operating on/off of the snubber switch according to the magnitude of the voltage being applied to the secondary side switch.

In addition, when the magnitude of the capacitor voltage is equal to or greater than a threshold value, the snubber switch may be turned on.

In addition, the controller may turn on the snubber switch when the magnitude of the voltage at the front end of the secondary side switch is greater than or equal to a threshold value.

In addition, the secondary side switch may be configured as a MOSFET.

In addition, on/off of the snubber switch may be controlled according to a duty ratio of the snubber switch.

In addition, the duty ratio of the snubber switch may be proportional to the magnitude of the voltage being applied to the secondary side switch.

In addition, it may include a pulse width modulator for modulating the pulse width of the control signal of the controller for the snubber switch.

In addition, the controller may include an OP-AMP.

In addition, the controller may include: a sensing resistor sensing the voltage of the capacitor; and an OP-AMP controlling the operation of the snubber switch and a duty ratio through the comparison of the detected voltage of the capacitor with a reference voltage.

In addition, the snubber switch may be configured as a MOSFET.

In addition, the switching frequency of the snubber switch may be less than or equal to the switching frequency of the secondary side switch.

In order to solve the above technical problem, a snubber circuit according to another embodiment of the present, which is connected to a plurality of secondary side switches of a transformer, comprises: a plurality of diodes being connected in parallel with each of the plurality of secondary side switches; one capacitor being connected to one node being connected to the output terminals of the plurality of diodes; a resistor being connected in parallel with the capacitor; a snubber switch connecting the resistor and the ground; and a controller operating the snubber switch according to the magnitude of the voltage being applied to the secondary side switch.

Advantageous Effects

According to embodiments of the present invention, snubber loss can be reduced. In addition, by using the voltage of the capacitor, it is possible to prevent the source of burnout caused by exceeding the withstand voltage of the secondary side power MOSFET. In addition, it is possible to lower the resistance value of the snubber resistor, so it can be quickly stabilized in a situation where the input voltage overshooting occurs. Furthermore, it is possible to block the dark current flowing from the output side to the snubber circuit in a state in which the operation is stopped.

The effect according to the present invention is not limited by the contents exemplified above, and more various effects are included in the present specification.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
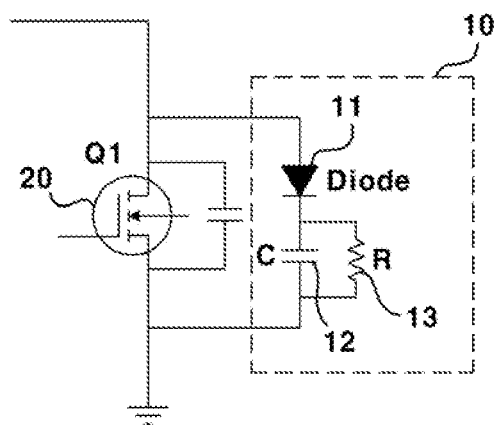
FIG. 1 illustrates a snubber circuit according to a comparative example with the present invention.

FIG. 1 illustrates a snubber circuit according to a comparative example with the present invention.

Referring to FIG. 1, a snubber circuit 10 may be connected to the switch Q1 (20) in order to reduce the voltage stress of the switch Q1 (20). Here, the switch Q1 (20) may be a secondary side switch of the transformer. When the switch Q1 (20) is turned off, energy is transferred to the capacitor C (12), which is a snubber capacitor, through the snubber diode and is stored, and the energy stored in the snubber capacitor C (12) is connected in parallel with the capacitor C (12), and it is consumed in the snubber resistor R (13). Accordingly, the voltage between the drain and the source of the switch Q1 (20) configured with a MOSFET decreases.

Such a snubber circuit is formed of resistors, capacitors, and diodes and is called an RCD snubber circuit, and it always operates regardless of the voltage level at which the switch operates. In addition, the RC value of the snubber circuit is selected at the maximum operating voltage to satisfy the voltage rating of the switch, so there is a problem in that when the operating voltage range is wide, unnecessary snubber loss occurs below the maximum voltage, thereby reducing the light load efficiency.

Figure 2:
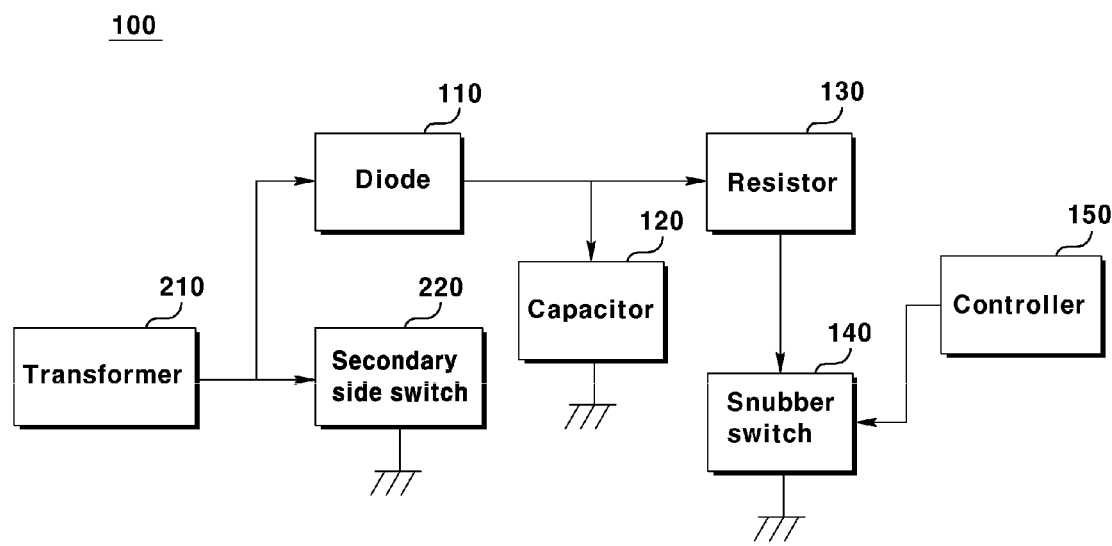
FIG. 2 is a block diagram of a snubber circuit according to an embodiment of the present invention.

In order to solve this loss, a snubber circuit according to an embodiment of the present invention may be formed as shown in FIG. 2.

FIG. 2 is a block diagram of a snubber circuit according to an embodiment of the present invention.

A snubber circuit 100 according to an embodiment of the present invention is a snubber circuit being connected to a secondary side switch of a transformer, and is configured with a diode 110, a capacitor 120, a resistor 130, and a snubber switch 140, and may further include a controller 150.

The diode 110 is connected to the input terminal of the secondary side switch 220. More specifically, the diode 110 is a snubber diode comprising the snubber circuit and is connected in parallel with the secondary side switch 220, which is a secondary side switch of the transformer, to receive a voltage being applied to the secondary side switch 220 in parallel.

Capacitor 120 is connected to the output terminal of diode 110. More specifically, the capacitor 120 is a snubber capacitor comprising the snubber circuit and is connected in series with the diode 110 to store energy generated according to the operation of the secondary side switch 220.

The resistor 130 is connected in parallel with the capacitor 120. More specifically, the resistor 130 is a snubber resistor comprising the snubber circuit and is connected in parallel with the capacitor 120. That is, it is branched from the diode 110 and connected in parallel with the capacitor 120, and when the snubber switch 140 is turned on, energy stored in the capacitor 120 is consumed.

The specifications of the capacitor 120 and the resistor 130 may be set according to the voltage rating of the secondary side switch 220 to be protected by the snubber circuit 100.

The snubber switch 140 connects the resistor 130 and the ground. More specifically, when the snubber switch 140 is on, the resistor 130 and the ground are connected, and when the snubber switch 140 is off, the resistor 130 and the ground are disconnected.

When the snubber switch 140 is turned on, a path including the resistor 130 is connected so that the resistor 130 discharges the energy stored in the capacitor 120. When the snubber switch 140 is turned on and the resistor 130 and the ground are connected, the path formed by the capacitor 120, the resistor 130, and the ground is connected so that the resistor 130 consumes the energy stored in the capacitor 120 to be discharged. When the snubber switch 140 is turned off, the resistor 130 is not connected to the ground, and since the path formed by the capacitor 120 and the resistor 130 is not connected to the ground, the resistor 130 does not consume energy stored in the capacitor 120. Through this, the resistor 130 does not constantly discharge the energy stored in the capacitor 120, but discharges the energy stored in the capacitor 120 only when necessary, thereby reducing unnecessary loss occurring in the resistor 130.

The snubber switch 140 may be configured as a MOSFET. The MOSFET is a metal oxide semiconductor field effect transistor and is comprised of a source, a drain, and a gate. According to the characteristics of the semiconductor device used, it is divided into NMOS or PMOS. When a voltage is applied to the gate, a channel is formed between the source and the drain so that current flows through the channel that has been formed, and thus it can be used as a switch using this operating principle. The controller 150 may control the gate voltage of the snubber switch 140 to operate the snubber switch 140. By configuring the snubber switch 140 as a MOSFET, it is possible to reduce the loss by controlling the blocking of energy discharge in the resistor 130 according to the gate signal, and when the transformer does not work, the dark current flowing from the output side to the snubber circuit may also be blocked.

The controller 150 may turn on/off the snubber switch 140 according to the magnitude of the voltage applied to the secondary side switch 220.

More specifically, in order to reduce the loss occurring in the resistor 130, it is necessary to control the operation of the snubber switch 140 that connects the resistor 130 to the ground, and when the resistor 130 needs to consume the energy stored in the capacitor 120, the controller 150 turns on the snubber switch 140, and since the snubber circuit 100 is a circuit for protecting the secondary side switch 220, it may turn the snubber switch 140 on and off according to the magnitude of the voltage applied to the secondary side switch 220. When the voltage applied to the secondary side switch 220 becomes greater than or close to the voltage rating of the secondary side switch 220, the controller 150 operates the snubber switch 140 so as not to be deviated from the rated voltage rating of the secondary side switch 220.

Since energy can be efficiently consumed in the resistor 130 through the controller 150, the resistance value of the snubber circuit can be set to be low. By using a resistor with a low resistance value as the resistance of the snubber circuit, rapid consumption is possible in an over-shooting situation of instantaneous input voltage exceeding the voltage rating. For example, when the controller 150 is not used, the size of the snubber resistor can be reduced from 10 KΩ to 100Ω, and since the power consumption is $V^2/R$, the smaller the value of R, the greater the power consumption therein, thereby being quickly stabilized.

The controller 150 may perform on/off operation of the snubber switch 140 by controlling the duty ratio of the switch. The controller 150 may control the duty ratio when operating the snubber switch 140 and controlling on/off. Here, the duty ratio is a ratio of a current flowing time to a non-current flowing time. In the case of a switch, the duty ratio means a turn-on ratio, and it is also referred to as a duty ratio. That is, the driving speed or driving time of the motor can be controlled by controlling the rate at which the switch is turned on. In the case of the operating speed, it can be controlled by varying the degree of repeating on-off within a short period of time. The driving speed becomes slower in the case of repeating on-off operation than in the case of continuously turning on. The on-state time of the switch varies according to the duty ratio, and energy consumed by the resistor 130 can be adjusted accordingly, so that loss can be effectively reduced.

The controller 150 may control the duty ratio of the snubber switch 140 to be proportional to the magnitude of the voltage applied to the secondary side switch 220. As the magnitude of the voltage applied to the secondary side switch 220 increases, in order to protect the secondary side switch 220, since the energy to be consumed in the resistor 130 may be increased, the duty ratio of the snubber switch 140 may be increased or the snubber switch 140 may be maintained in an on state. The duty ratio of the snubber switch can be set to 100.

In order to control the duty ratio of the snubber switch 140, a pulse width modulator for modulating a pulse width of a control signal of the controller 150 for the snubber switch may be included. pulse width modulation (PWM) is a method of changing a pulse width according to the amplitude of a signal. When the voltage applied to the secondary side switch 220 increases, the loss rate can be effectively reduced by varying the duty ratio to increase the pulse width of the control signal for turning on the snubber switch 140.

Figure 3:
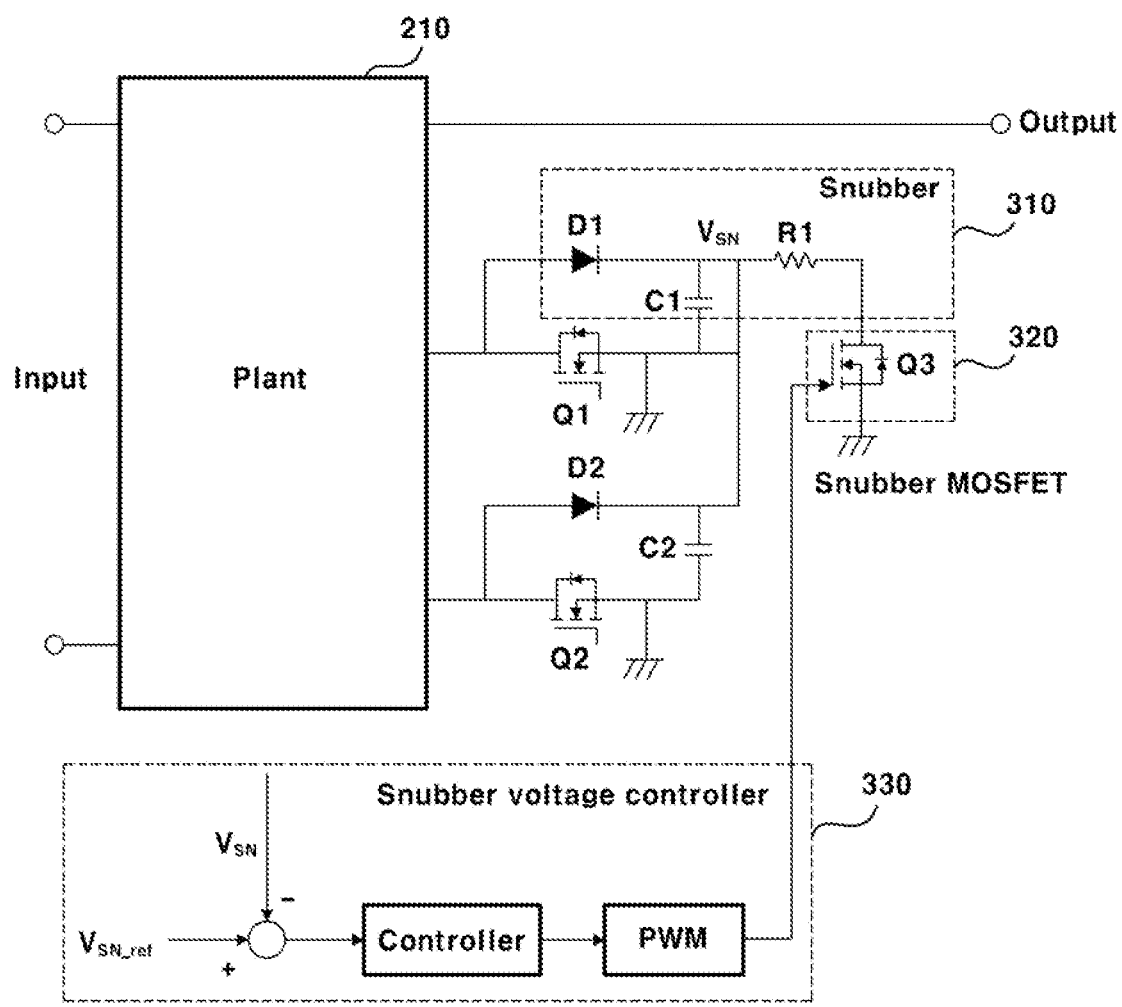
FIG. 3 and FIG. 4 are diagrams for explaining the operation of a snubber circuit according to an embodiment of the present invention.

A snubber circuit according to an embodiment of the present invention may be formed on the circuit as shown in FIG. 3. A snubber circuit is formed in the switch to protect the secondary side switches Q1 and Q2 of the transformer. A diode D1 is connected in parallel to the secondary side switch Q1, and a capacitor C1 and a resistor R1 connected in parallel comprising the snubber circuit 310 are connected to D1. The snubber circuit 310 including D1, C1, and R1 may clamp a voltage spike of Q1, which is a secondary side switch. A snubber switch Q3 (320) is connected to R1 to turn on/off the path between R1 and ground. At this time, the controller 330 for operating the snubber switch Q3 compares the measured voltage and the reference voltage, and operates the snubber switch Q3 (320) using the comparison result. In this case, the snubber switch Q3 (320) may be controlled through modulation of pulse width using pulse width modulation (PWM). Here, the snubber switch Q3 may be configured as a MOSFET.

Figure 4:
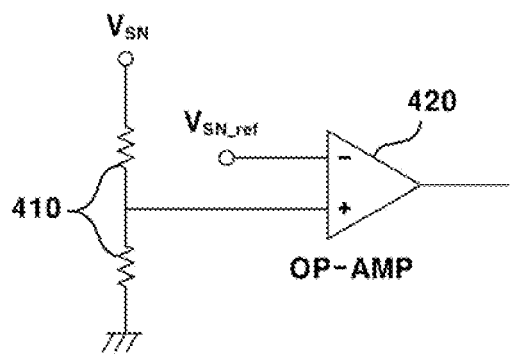

The controller 150 may be implemented as an OP-AMP, as shown in FIG. 4. Comparison of the measured voltage and the reference voltage and pulse width modulation can be simultaneously performed by implementing the controller 150 using an OP-AMP. More specifically, the controller 150 may include a sensing resistor 130 for sensing a voltage; and an OP-AMP 420 that controls the operation of the snubber switch 140 and the duty ratio through the comparison between the voltage that has been detected and a reference voltage.

The voltage of the capacitor 120 or the voltage VSN of the front end of the secondary side switch 220 is detected using the sensing resistor 410, and the snubber switch 140 may be operated by comparing the voltage detected by the OP-AMP 420 with the reference voltage VSN_ref.

The voltage of the capacitor 120 or the voltage at the front end of the secondary side switch 220 may be used as a voltage measured by the controller 150 to operate the snubber switch 140.

Figure 5:
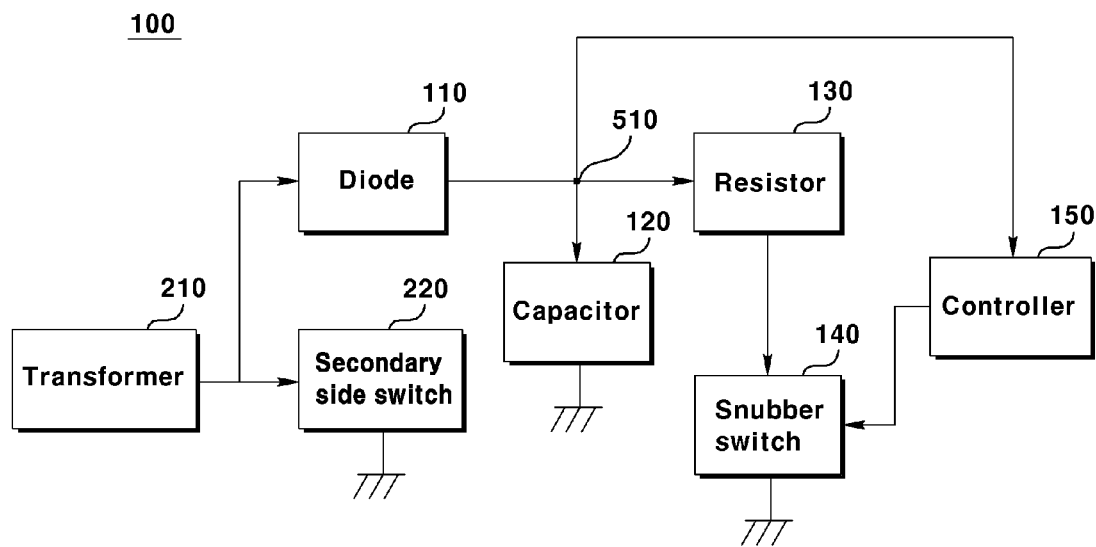
FIGS. 5 to FIG. 8 are diagrams for explaining a snubber circuit according to another embodiment of the present invention.

First, the controller 150 may use the magnitude of the voltage of the capacitor 120 as a reference for operating the snubber switch to protect the secondary side switch 220. The controller 150, as shown in FIG. 5, measures the voltage applied to the capacitor 120 at the front terminal 510 of the capacitor, and when the measured voltage of the capacitor 120 is greater than or equal to a threshold value, may operate the snubber switch 140. The threshold value for controlling the snubber switch 140 may be set according to the voltage rating of the secondary side switch 220 as a reference voltage. When the rated voltage is applied to the secondary side switch 220, the magnitude of the voltage at the corresponding position may be set as the reference voltage, or a voltage smaller than the reference voltage by the margin voltage may be set as the reference voltage by applying a margin to the reference voltage. Or, it may be set by the user. As the reference voltage, which is the threshold value, is increased, the magnitude of the voltage at which the snubber switch operates is increased, and thus the stability to protect the secondary side switch may be deteriorated while the loss rate can be reduced. Conversely, the smaller the reference voltage, the higher the stability of the secondary side switch, but the loss rate can also be higher therefore both loss rate and stability can be enhanced by setting an appropriate reference voltage.

Since the voltage applied to the capacitor 120 is limited to less than the voltage applied to the secondary side switch, it is possible to fundamentally prevent burnout caused by exceeding the withstand voltage of the secondary side switch by using the voltage applied to the capacitor 120.

Figure 6:
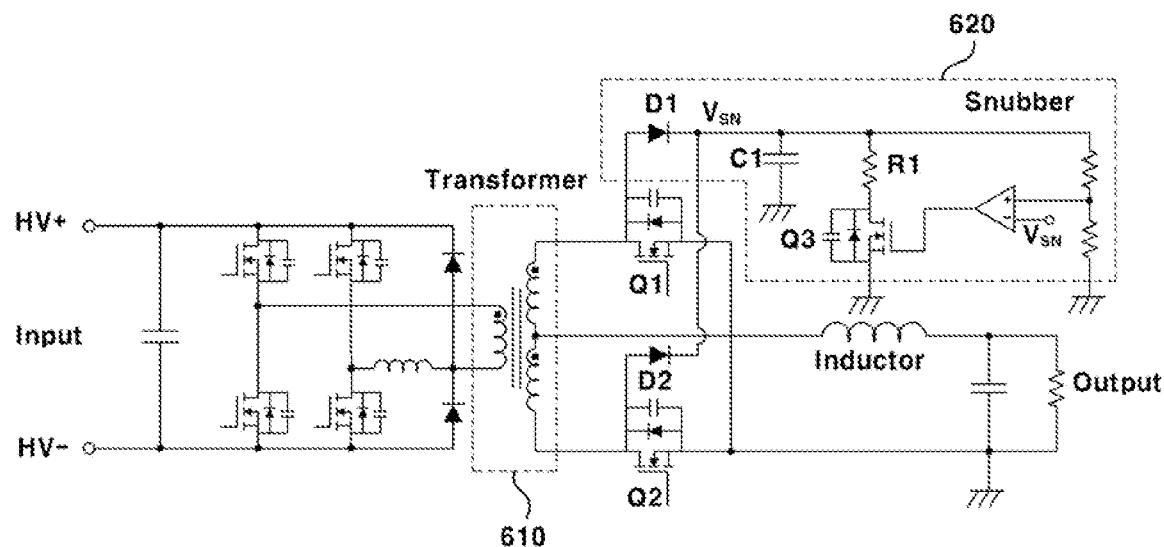

A snubber circuit in which the controller 150 measures the voltage of the capacitor 120 to operate the snubber switch 140 may be implemented as shown in FIG. 6. In the transformer 610 for transforming a voltage, a snubber circuit 620 that protects the secondary side switch may be connected to the secondary side switch.

Here, the transformer may be a switching mode power supply (SMPS). SMPS is a switching mode power supply that uses a semiconductor element such as a power MOSFET as a switch to convert a DC input voltage into a square wave voltage, and then obtains a controlled DC output voltage through a filter, and it is a stabilized power supply with high efficiency and strong durability, and is advantageous in miniaturization and weight reduction by controlling the flow of power through switching of semiconductor elements. SMPS has the advantage of miniaturization and weight reduction by increasing the switching frequency to miniaturize the energy storage device, but there is a disadvantage in that the switching loss increases by increasing the switching frequency. It receives an input voltage, converts it into a plurality of phases using a plurality of half-bridge circuits, and performs transformation, but outputs a DC voltage using a filter including an inductor and a capacitor. At this time, the secondary side of the transformer connects the switch to output the voltage applied to each phase as a DC voltage. To protect the secondary side switch, a snubber circuit may be connected.

Specifically, the snubber circuit receives a voltage being applied to Q1 as a diode D1 is connected in parallel to the secondary side switch Q1, and the voltage applied to D1, that is an energy, is stored in the capacitor C1 comprising the snubber circuit 100. A resistor R1 is connected in parallel to C1, and a snubber switch Q3 connected in series with R1 may turn on/off the connection between R1 and ground. It may include an OP-AMP for controlling Q3 by comparing the sensing resistor for measuring the voltage of the capacitor with the measured voltage VSN and the reference voltage VSN_ref. That is, the snubber switch Q3 operates according to the magnitude of the voltage of the capacitor C1, and when Q3 is turned on, energy consumption is achieved in R1 at last, so that the loss rate can be reduced.

When the transformer is a multi-phase transformer, the secondary side switches of the transformer may be plural. In this case, a plurality of secondary side switches Q1 and Q2 may share one snubber circuit 620. That is, by connecting the diode D2 in parallel to Q2 and configuring the circuit to be combined with D1 and connected to the capacitor C1, it is possible to protect not only Q1 but also Q2 with one snubber circuit.

Figure 7:
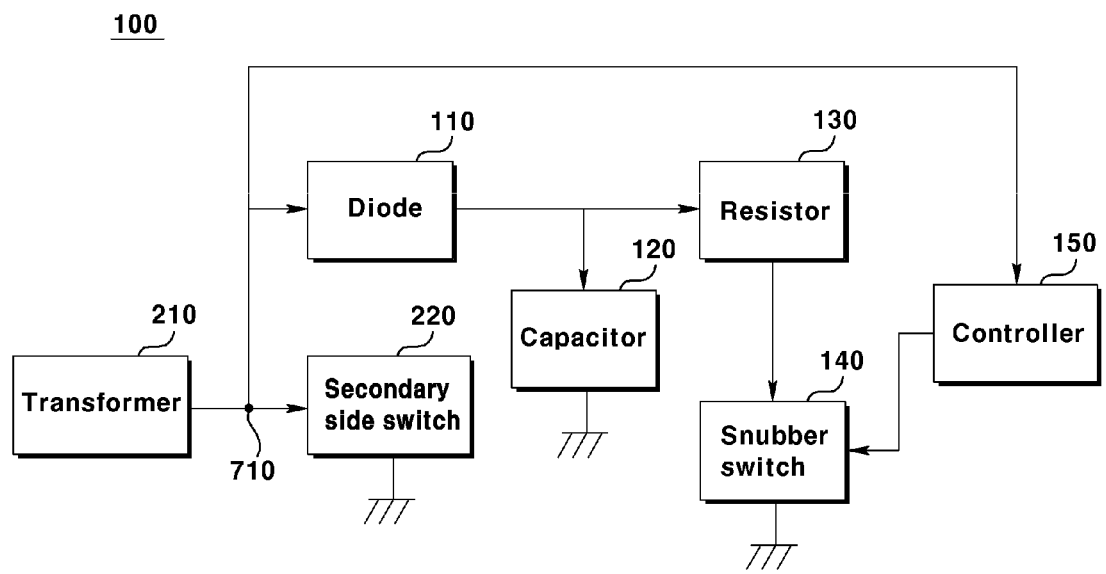
Figure 8:
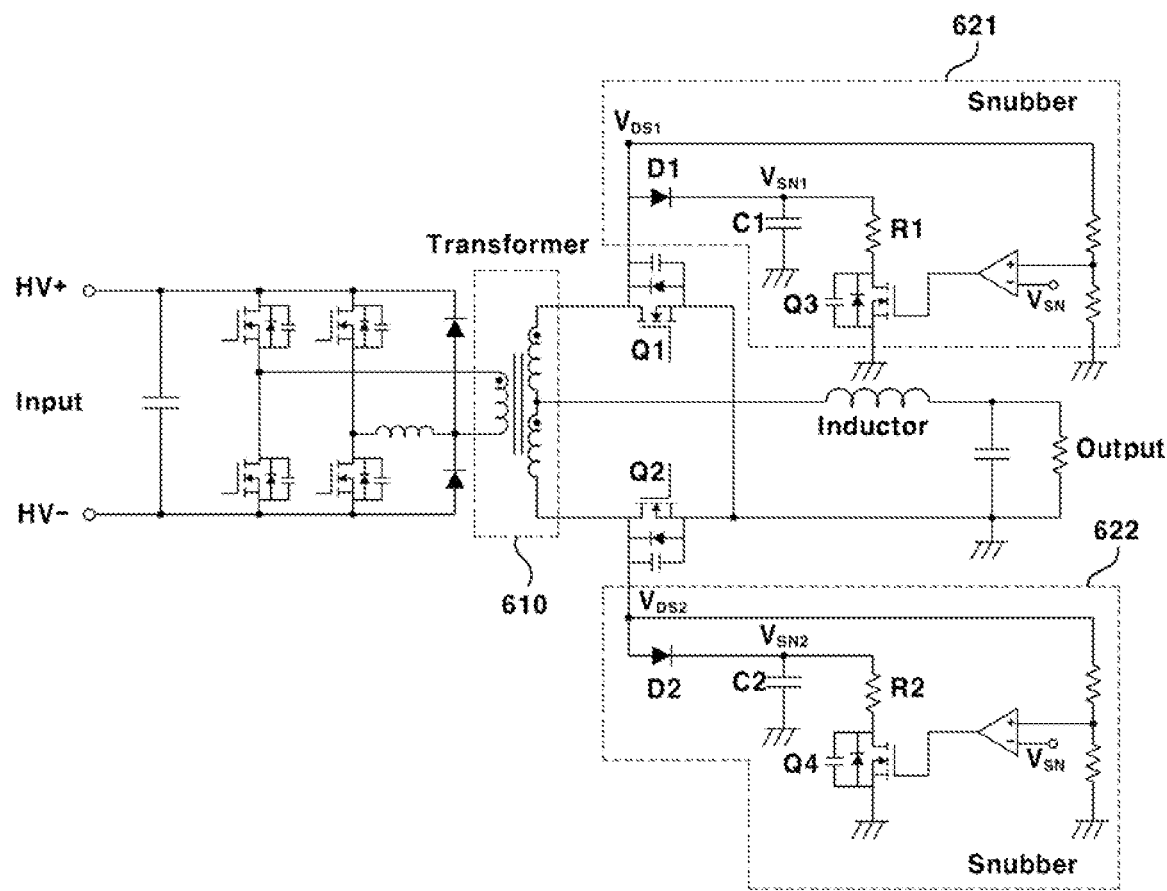

Unlike FIGS. 5 and 6, the controller 150 measures the voltage at the front end of the secondary side switch 220, as shown in FIGS. 7 and 8, and when the magnitude of the voltage at the front end of the secondary side switch 220 is greater than or equal to the threshold value, may operate the snubber switch 140. As shown in FIG. 7, the controller 150 measures the secondary side switch 220 at the front end 710 and may operate the snubber switch 140 according to the magnitude of the measured voltage. At this time, the secondary side switch 220 is configured as a MOSFET, and the controller 150 may operate the snubber switch 140 when the drain voltage of the secondary side switch 220 is greater than or equal to the threshold value. When the secondary side switch 220 is configured as a MOSFET, since the input terminal side of the secondary side switch 220 corresponds to the drain voltage, the controller 150 measures the magnitude of the drain voltage of the secondary side switch 220, may operate the snubber switch 140 when the drain voltage of the secondary side switch 220 is greater than or equal to the threshold value.

Referring to FIG. 8, unlike FIG. 6 in which the voltage VSN1 of the capacitor is measured, the drain voltage VDS1 of the secondary side switch Q1 is measured, and the snubber switch Q3 is operated through comparison with the reference voltage. At this time, when the snubber switch is operated using the drain voltage of Q1 without going through the diode D1, it is difficult to share one snubber circuit for a plurality of secondary side switches, so a snubber circuit must be connected to each secondary side switch. That is, as shown in FIG. 8, since each of the snubber circuits 621 and 622 should be connected to the secondary side switches Q1 and Q2, the number of components comprising the snubber circuit may be increased compared to FIG. 6.

Figure 9:
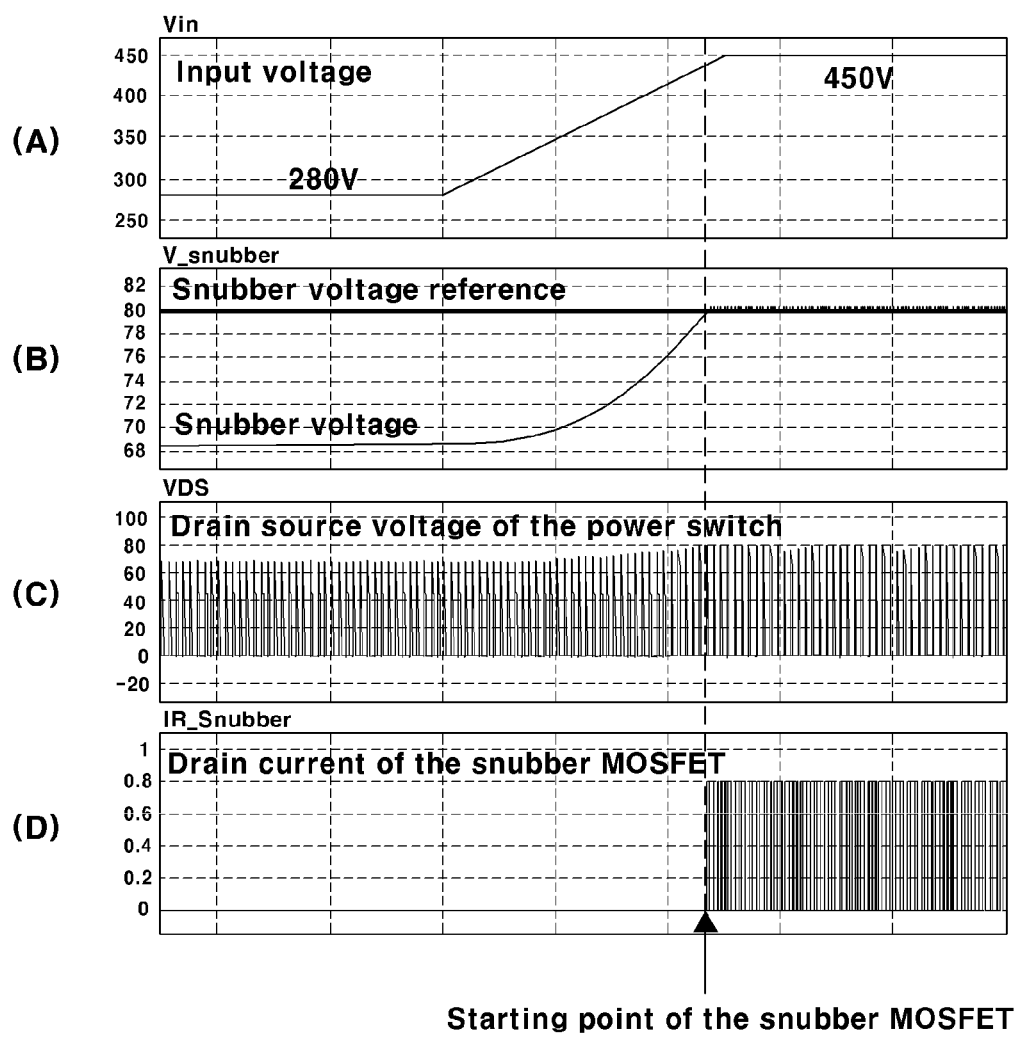
FIG. 9 illustrates a result applied to a snubber circuit according to an embodiment of the present invention.

FIG. 9 is a graph showing the operation according to the snubber circuit according to the embodiment of the present invention, as in FIG. 9(A), when the input voltage is low, as in FIG. 9(B), the snubber voltage measured by the snubber is lower than the snubber reference voltage, or the magnitude of the drain-source voltage of the secondary side switch is low as shown in FIG. 9(C), and at this time, as shown in FIG. 9(D), the snubber switch does not operate. The output of the controller implemented as OP-AMP is in a low state and the snubber switch also maintains an off state, and at this time, the loss is 0 W by the snubber circuit.

Thereafter, when the input voltage increases, the snubber voltage measured by the snubber increases and becomes larger than the snubber reference voltage, or when the drain-source voltage of the secondary side switch becomes more than the threshold, the drain-source voltage of the snubber switch increases, and the snubber switch is turned on and operated. That is, the output of the OP-AMP is in a high state to turn on the snubber switch, and as the input voltage increases, the duty ratio of the snubber switch may be increased.

In operating the snubber switch, the switching frequency of the snubber switch may be limited to less than or equal to the switching frequency of the secondary side switch. SMPS operates by increasing the switching frequency of the secondary side switch, but when the switching frequency of the snubber switch is greater than the switching frequency of the secondary side switch, noise and the like may be generated. Therefore, the switching frequency of the snubber switch may be limited to less than or equal to the switching frequency of the secondary side switch.

As described above, it is possible to solve the problem of a passive snubber circuit having a high loss rate by controlling the energy consumption in the resistor according to the magnitude of the voltage. In addition, in the case of an active snubber circuit, an energy storage device such as an inductor or a gate driver IC for controlling a switch is required, however, the snubber circuit according to an embodiment of the present invention can control the switch only with the OP-AMP that compares a measured voltage and a reference voltage, and thus, the circuit is not complicated and can be implemented simply when compared to the active snubber circuit.

Figure 10:
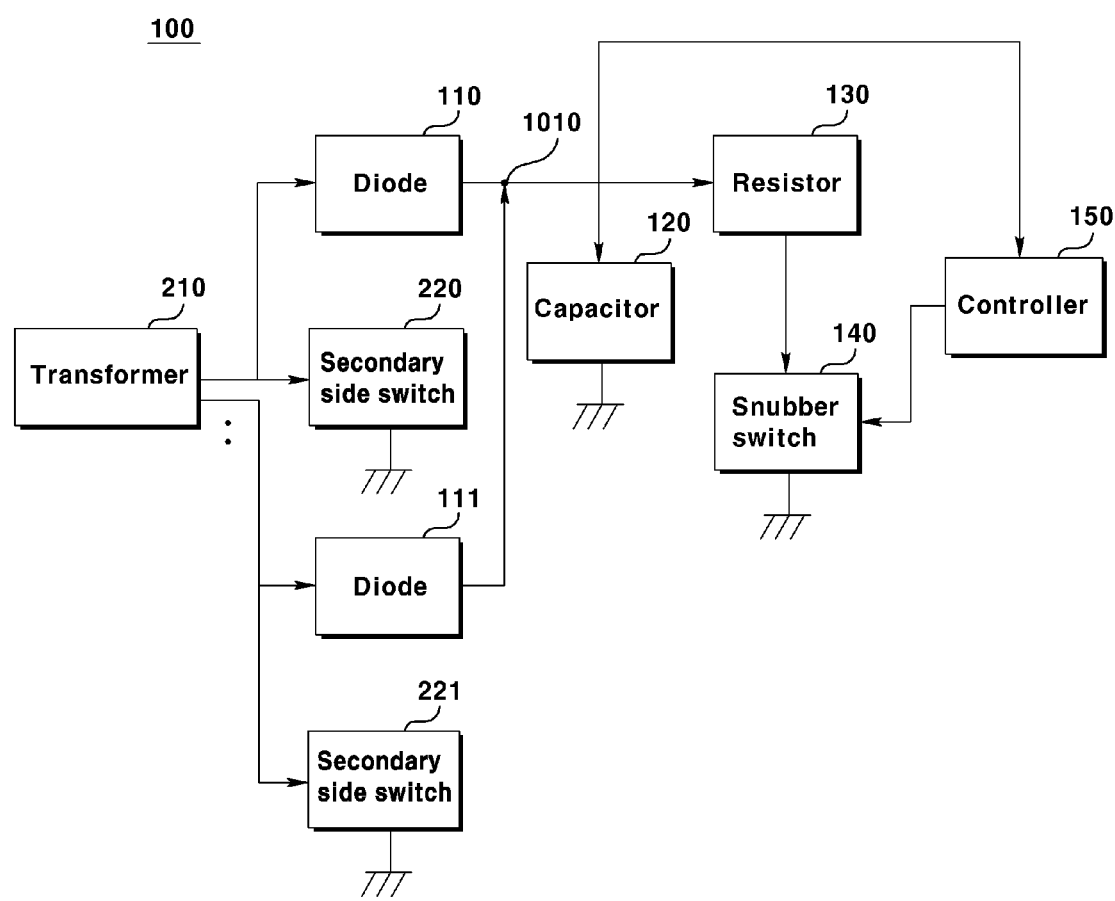
FIGS. 10 and FIG. 11 are block diagrams of a snubber circuit according to another embodiment of the present invention.
Figure 11:
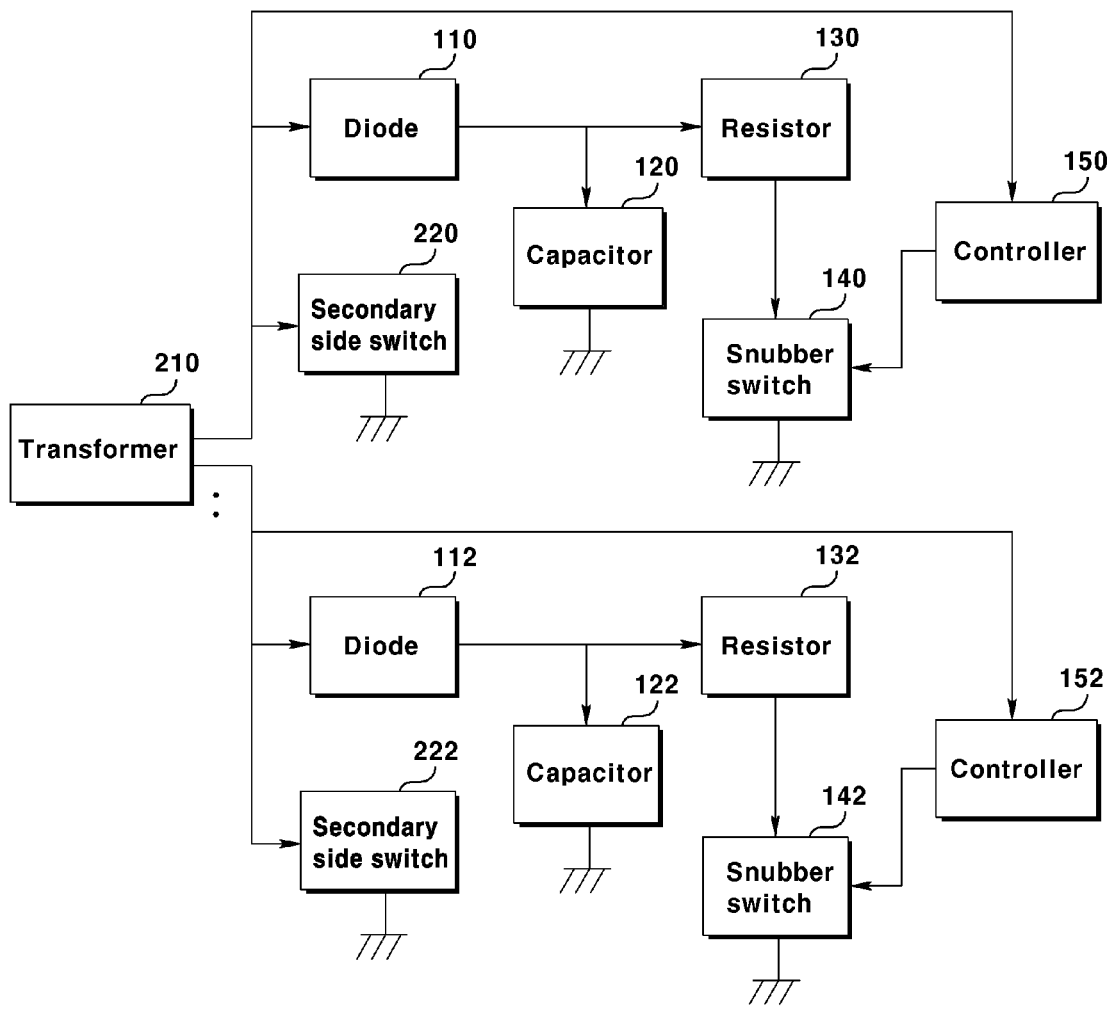

FIGS. 10 and 11 are block diagrams of a snubber circuit according to another embodiment of the present invention. A detailed description of each configuration of the snubber circuit of FIGS. 10 and 11 corresponds to a detailed description of a corresponding configuration of the snubber circuit of FIGS. 1 to 9, and the overlapping descriptions will be omitted below.

In the snubber circuit connected to the plurality of secondary side switches 220 and 221 of the transformer 210, the snubber circuit according to the embodiment of FIG. 10 configures a snubber circuit to share one snubber circuit for a plurality of secondary side switches 220 and 221. The snubber circuit according to an embodiment of FIG. 10 may be implemented as shown in FIG. 6.

It may include: one capacitor 120, in which a plurality of diodes 110 and 111 is connected in parallel with each of the plurality of secondary side switches 220 and 221 in parallel, being connected to one node 1010 connected to the output terminal of the plurality of diodes; a resistor 130 being connected in parallel with the capacitor 120; a snubber switch 140 connecting the resistor 130 and the ground; and a controller 150 that operates the snubber switch 140 according to the magnitude of the voltage applied to the secondary side switch. Since the secondary side switches of the multiphase transformer operate complementary, it is possible to protect a plurality of secondary side switches using one snubber circuit, accordingly a snubber circuit can be implemented by using a plurality of diodes 110 and 111, one capacitor 120, one resistor 130, one snubber switch 140, and one controller 150. At this time, the voltage for determining whether the snubber switch 140 operates uses the voltage of the capacitor 120.

In the plurality of snubber circuits connected to the plurality of secondary side switches 220 and 222 of the transformer 210, the snubber circuit according to the embodiment of FIG. 11 comprises a snubber circuit for each of the plurality of secondary side switches 220 and 222. A snubber circuit according to the embodiment of FIG. 11 may be implemented as shown in FIG. 8.

Each snubber circuit of the plurality of snubber circuits includes: a diode 110 and 112 connected in parallel with one of the plurality of secondary side switches 220 and 222; capacitors 120 and 122 being connected in series with the diodes 110 and 112; resistors 130 and 132 connected in parallel with the capacitors 110 and 112; the snubber switches 140 and 142 connecting the resistors 130 and 132 and the ground; and controllers 150 and 152 for operating the snubber switches 140 and 142 according to the magnitude of the voltage applied to the secondary side switch in which the diodes 110 and 112 are being connected in parallel. In order to determine the operation of the snubber switches 140 and 142, a snubber circuit is configured on each secondary side switch by using the voltage at the front end of each secondary side switch, not the voltage of the capacitor.

Meanwhile, the embodiments of the present invention can be implemented as computer-readable codes on a computer-readable recording medium. The computer-readable recording medium includes all types of recording devices in which data readable by a computer system is stored.

As examples of computer-readable recording media there are ROM, RAM, CD-ROM, magnetic tape, floppy disk, and optical data storage devices, and in addition, they are distributed across networked computer systems in a distributed manner in which computer-readable code can be stored and executed. And functional programs, codes, and code segments for implementing the present invention can be easily inferred by programmers in the technical field to which the present invention belongs.

As described above, in the present invention, specific matters such as specific components, and the like; and limited embodiments and drawings have been described, but these are only provided to help a more general understanding of the present invention, and the present invention is not limited to the above embodiments, and various modifications and variations are possible from these descriptions by those of ordinary skill in the art to which the present invention belongs.

Therefore, the spirit of the present invention should not be limited to the described embodiments, and not only the claims to be described later, but also all those with equivalent or equivalent modifications to the claims will be said to belong to the scope of the spirit of the present invention.

The invention claimed is:

1. A snubber circuit connected to a secondary side switch of a transformer, the snubber circuit comprising:
   a diode connected to an input terminal of the secondary side switch;
   a capacitor connected to an output terminal of the diode;
   a resistor connected in parallel with the capacitor;
   a snubber switch directly connecting the resistor and a ground;
   a sensing resistor connected to the input terminal of the secondary side switch and configured to detect voltage of the input terminal of the secondary side switch; and
   an OP-AMP being inputted the detected voltage of the input terminal of the secondary side switch and a reference voltage, and output a high or low signal to a gate of the snubber switch through a comparison of the detected voltage of the input terminal of the secondary side switch with the reference voltage,
   wherein a switching frequency of the snubber switch is less than or equal to a switching frequency of the secondary side switch, and
   wherein the resistor is disposed in between the capacitor and the snubber switch.

2. The snubber circuit according to claim 1, wherein a path comprising the resistor is connected so that the resistor discharges energy stored in the capacitor when the snubber switch is turned on.

3. The snubber circuit according to claim 1, wherein the snubber switch turns on or off according to a magnitude of voltage being applied to the secondary side switch.

4. The snubber circuit according to claim 3, wherein the snubber switch turns on when the magnitude of the voltage at a front end of the secondary side switch is greater than or equal to a threshold value.

5. The snubber circuit according to claim 1, wherein on/off of the snubber switch is controlled according to a duty ratio of the snubber switch.

6. The snubber circuit according to claim 5, wherein the duty ratio of the snubber switch is proportional to a magnitude of voltage being applied to the secondary side switch.

7. The snubber circuit according to claim 1, wherein the snubber switch is turned on when a magnitude of voltage of the capacitor is equal to or greater than a threshold value.

8. The snubber circuit according to claim 1, wherein the secondary side switch comprises a MOSFET.

9. The snubber circuit according to claim 1, wherein the snubber switch comprises a MOSFET.

10. A snubber circuit connected to a plurality of secondary side switches of a transformer, the snubber circuit comprising:
a plurality of diodes each of which is connected in parallel with one of the plurality of secondary side switches;
one capacitor connected to one node connected to output terminals of the plurality of diodes;
a resistor connected in parallel with the capacitor;
a snubber switch directly connecting the resistor and a ground;
a sensing resistor configured to detect voltage of the capacitor; and
an OP-AMP being inputted the detected voltage of the capacitor and a reference voltage, and configured to output a high or low signal to a gate of the snubber switch through a comparison of the detected voltage of the capacitor with the reference voltage,
wherein a switching frequency of the snubber switch is less than or equal to a switching frequency of all of the plurality of secondary side switches, and
wherein the resistor is disposed in between the capacitor and the snubber switch.

11. The snubber circuit according to claim 10, wherein a path comprising the resistor is connected so that the resistor discharges energy stored in the capacitor when the snubber switch is turned on.

12. The snubber circuit according to claim 10, wherein the snubber switch turns on or off according to a magnitude of voltage being applied to each of the plurality of secondary side switches.

13. The snubber circuit according to claim 12, wherein the snubber switch turns on when the magnitude of the voltage at a front end of at least one of the plurality of secondary side switches are greater than or equal to a threshold value.

14. The snubber circuit according to claim 10, wherein on/off of the snubber switch is controlled according to a duty ratio of the snubber switch.

15. The snubber circuit according to claim 14, wherein the duty ratio of the snubber switch is proportional to a magnitude of voltage being applied to one of the plurality of secondary side switches.

16. The snubber circuit according to claim 10, wherein the snubber switch is turned on when a magnitude of voltage of the capacitor is equal to or greater than a threshold value.

17. The snubber circuit according to claim 10, wherein the plurality of secondary side switches are MOSFETs.

18. The snubber circuit according to claim 10, wherein the snubber switch comprises a MOSFET.

* * * * *